United States Patent
Seki et al.

(10) Patent No.: US 6,684,013 B2
(45) Date of Patent: Jan. 27, 2004

(54) OPTICAL WAVEGUIDE DEVICE TO BE OPTICALLY POLED, METHOD OF MANUFACTURING OPTICAL WAVEGUIDE DEVICE TO BE OPTICALLY POLED, AND METHOD OF OPTICALLY POLING OPTICAL WAVEGUIDE DEVICE

(75) Inventors: Yuko Seki, Tokyo (JP); Yutaka Urino, Tokyo (JP); Akio Furukawa, Tokyo (JP); Tadahiko Hanada, Tokyo (JP); Naoki Ofusa, Tokyo (JP); Shigeru Yoneda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/862,479

(22) Filed: May 23, 2001

(65) Prior Publication Data

US 2001/0046353 A1 Nov. 29, 2001

(30) Foreign Application Priority Data

May 26, 2000 (JP) ....................... 2000-156635

(51) Int. Cl.$^7$ .............................. G02B 6/26; G02B 6/42
(52) U.S. Cl. ........................................................ 385/50
(58) Field of Search ......................... 385/37, 50, 39–43, 385/14, 129, 131, 8–9

(56) References Cited

U.S. PATENT DOCUMENTS

| | | | | |
|---|---|---|---|---|
| 4,690,488 A | * | 9/1987 | Gee et al. .................... | 359/900 |
| 5,112,531 A | * | 5/1992 | Sperling et al. ........ | 252/299.01 |
| 5,604,835 A | * | 2/1997 | Nakamura et al. .......... | 385/129 |
| 5,832,154 A | * | 11/1998 | Uetsuka et al. ................ | 385/37 |
| 6,169,830 B1 | * | 1/2001 | Kewitsch et al. .............. | 385/37 |
| 6,221,565 B1 | * | 4/2001 | Jain et al. ...................... | 216/24 |
| 6,400,872 B1 | * | 6/2002 | Gehler ......................... | 385/14 |
| 6,442,311 B1 | * | 8/2002 | Barbarossa et al. ........... | 385/37 |

FOREIGN PATENT DOCUMENTS

| | | |
|---|---|---|
| JP | 09-258151 | 10/1997 |
| JP | 10-90546 | 4/1998 |

* cited by examiner

Primary Examiner—Tarifur R. Chowdhury
Assistant Examiner—Richard Kim
(74) Attorney, Agent, or Firm—Sughrue Mion, PLLC

(57) ABSTRACT

A waveguide optical switch has a waveguide whose refractive index changes can be controlled by an electro-optic effect and an UV guide waveguide for coupling an ultraviolet radiation to the waveguide. A portion of the waveguide and a portion of the UV guide waveguide make up a directional coupler.

21 Claims, 13 Drawing Sheets

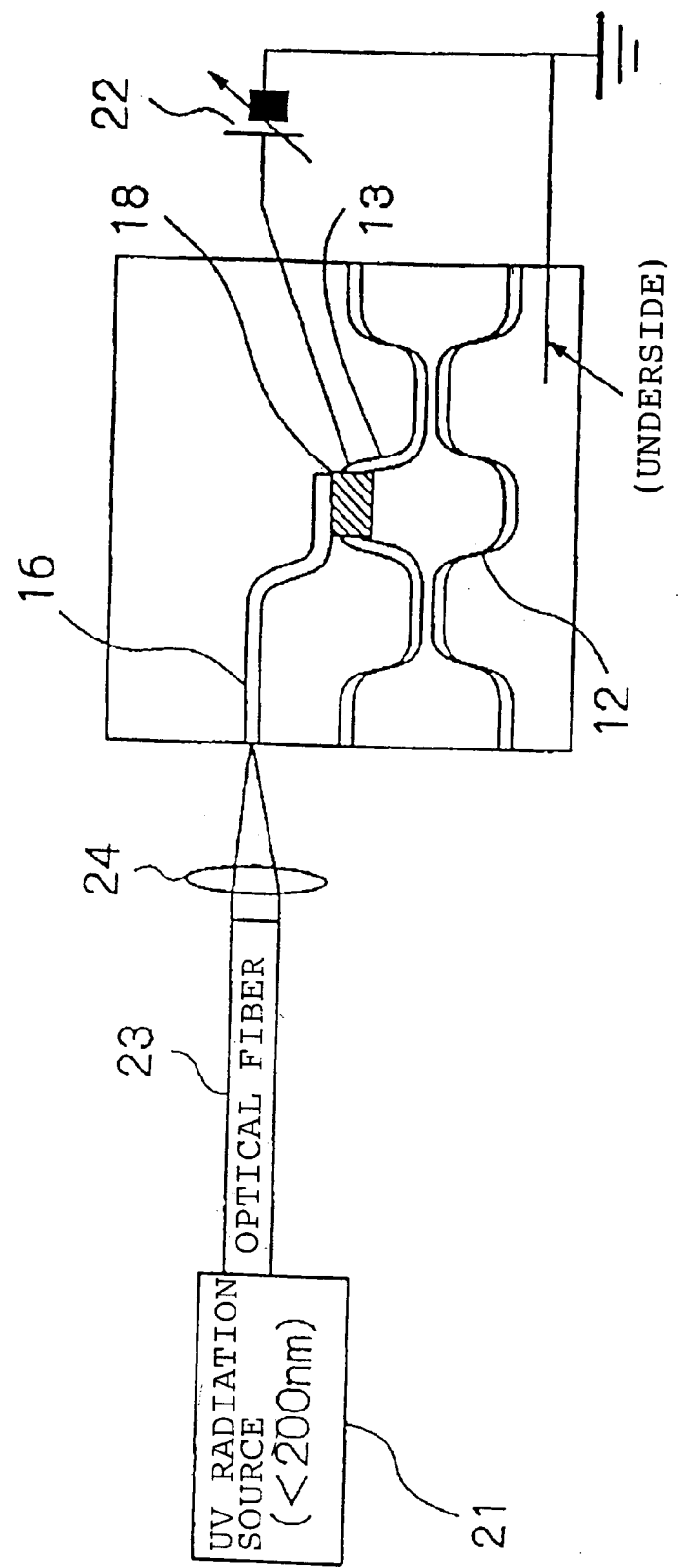

Fig. 9
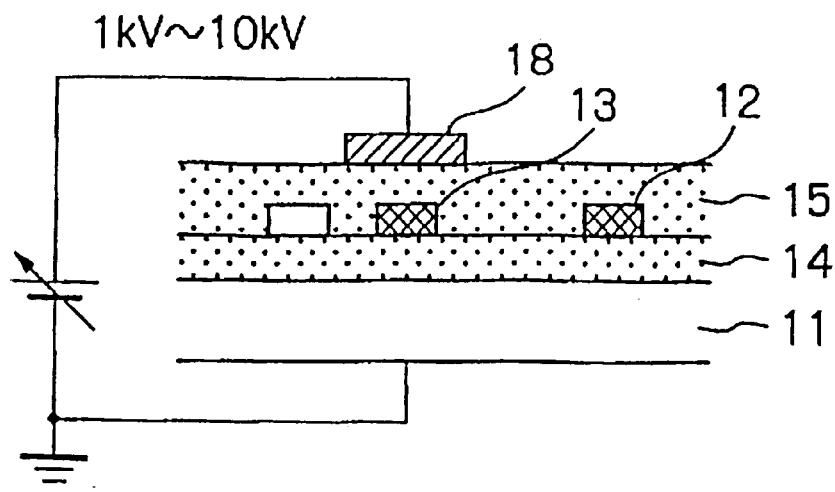
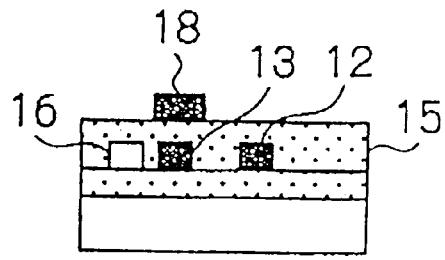
Fig. 10(a)
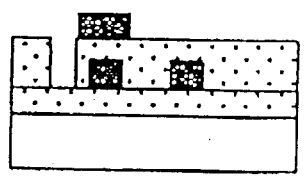
Fig. 10(b)
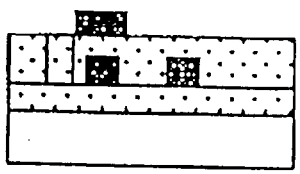
Fig. 10(c)

Fig. 14
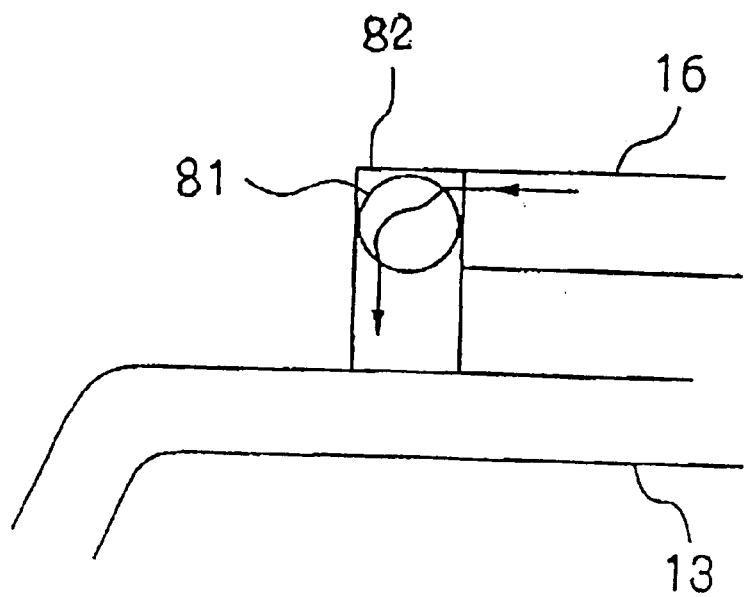
Fgi. 15
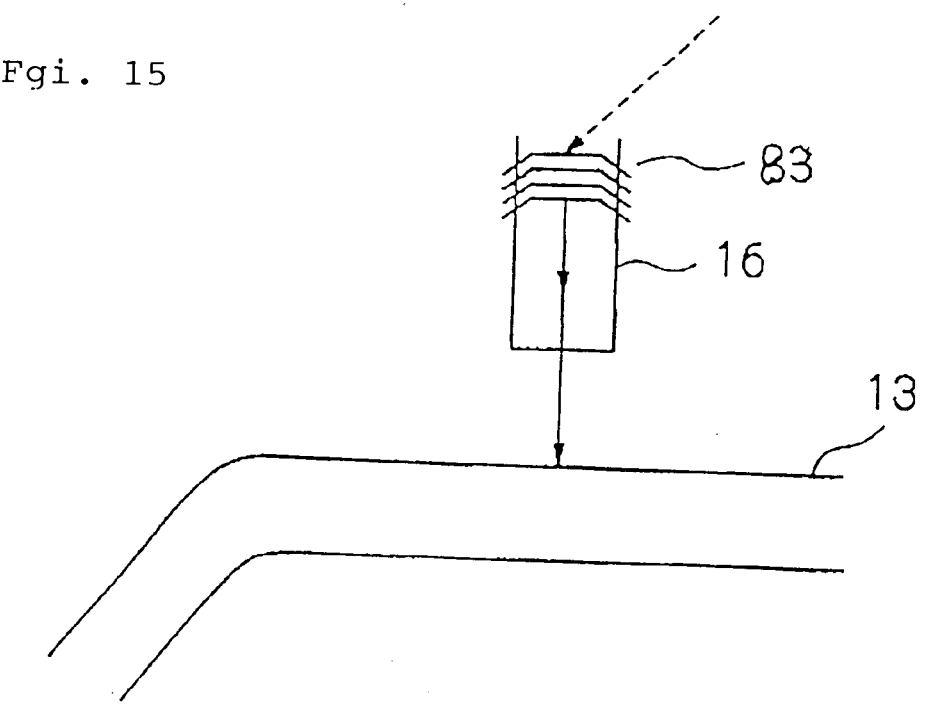

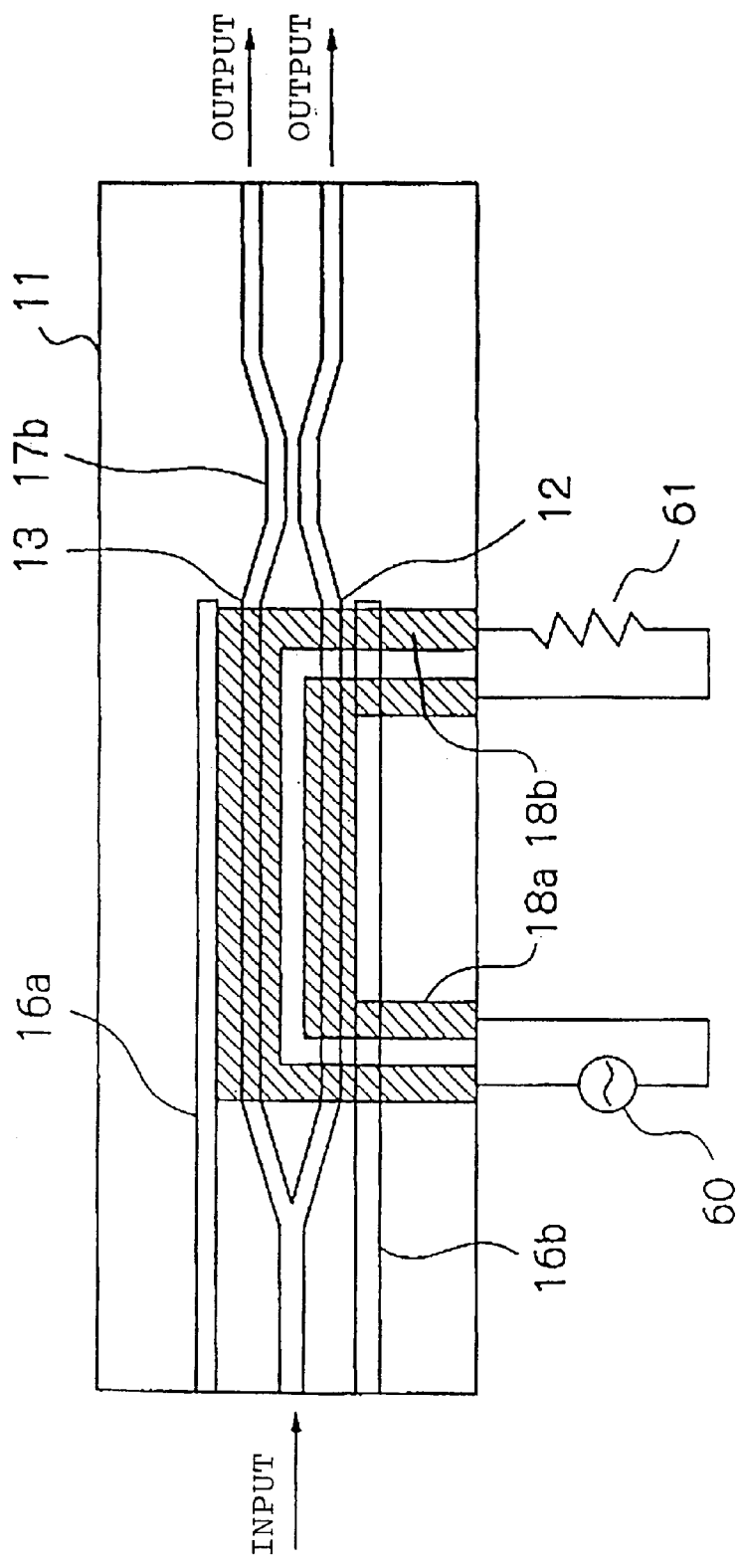

AMOUNT OF PHASE SHIFT DEPENDING ON
APPLIED SIGNAL VOLTAGE ($\phi$(rad))

OPTICAL WAVEGUIDE DEVICE TO BE OPTICALLY POLED, METHOD OF MANUFACTURING OPTICAL WAVEGUIDE DEVICE TO BE OPTICALLY POLED, AND METHOD OF OPTICALLY POLING OPTICAL WAVEGUIDE DEVICE

BACKGROUND OF THE INVENTION (1) Field of the Invention

The present invention relates to the art of poling an optical waveguide device for use in the field of optical communications, and more particularly to an optical waveguide device to be subjected to optical poling based on the application of both an ultraviolet radiation and an electric field, a method of manufacturing such an optical waveguide device, and a method of optically poling such an optical waveguide device.

(2) Description of the Prior Art

One type of optical waveguide device is available as a waveguide optical switch. The waveguide optical switch comprises an optical substrate and an optical waveguide made of a given material that is disposed on the optical waveguide. The waveguide optical switch performs a switching action by changing the intensity of light or changing light paths when the waveguide optical switch is caused to change its refractive index by a thermo-optic effect or an electro-optic effect. Waveguide optical switches whose optical waveguides are made of quartz have recently been expected to find practical applications because they suffer a small loss, allow quartz waveguides to be fabricated together on one substrate, and can be connected for good matching to a single-mode fiber of quartz.

A specific optical switch using a quartz waveguide that has come into reality is a TO (Thermal Optical) switch as introduced by N. Takao, et. al., "Silica-Based Single-Mode Waveguides on Silicon and their Application to Guide-Wave Optical Interferometers", J. Light Technol., VOL. 6, 1988, pp. 1003–1010. However, the introduced TO switch has a response speed of about 1 msec, and is not suitable for high-speed signal processing applications.

One waveguide optical switch that can possibly be used as a high-speed switch is a waveguide optical switch whose response speed is increased by the Pockels effect that is induced by thermal poling to apply a high voltage at an increased temperature. The Pockels effect is described in detail by P. G. Kazansky, et. al. "Pockels effect in thermally poled silica optical fibers", Electronics Lett., Vol. 31, 1995, pp. 62–63.

The above article reports that the Pockels effect offers a response speed of 10 nsec or lower, allowing a high-speed switch operable at a frequency of 100 MHz or higher to be realized. However, the drive voltage for the high-speed switch is required to be 1 kV or higher because an electro-optical constant inducted by thermal poling has a small value of 0.05 pm/V or lower.

The Pockels effect can be enhanced by an optically pumped poling process which applies visible light or ultraviolet (UV) radiation while under an electric field. An article by T. Fujiwara, D. Wong, Y. Zhao, S. Fleming, S. Poole, and M. Sceats, Electron Lett., 31, 1995, 573 has reported that a high electro-optical constant of 6 pm/V is obtained by optically pumped poling.

Japanese laid-open patent publication No. 9-258151 discloses a waveguide optical switch based on optically pumped poling. FIG. 1 of the accompanying drawings schematically shows the disclosed waveguide optical switch.

The waveguide optical switch shown in FIG. 1 is a Mach-Zehnder interferometer waveguide optical switch which has two waveguides 112, 113, serving as Mach-Zehnder interferometer arms, disposed on Si substrate 111, with thin film electrode 116 disposed on one of waveguides 112. Waveguides 112, 113 have ends coupled respectively to two input waveguides as input ports P1, P2 by directional coupler 117, and other ends coupled respectively to two output waveguides as output ports P3, P4 by directional coupler 118.

The illustrated Mach-Zehnder interferometer waveguide optical switch is poled as follows: While a laser beam having a prespecified wavelength, i.e., such a wavelength that will not cause a coupling in directional couplers 117, 118, is being introduced from input port P1, a voltage of a certain magnitude is applied between thin-film electrode 116 and Si substrate 111. The laser beam introduced from input port P1 is not coupled in directional coupler 117, but propagated through waveguide 112 as one of the arms. After elapse of a predetermined time, the laser beam is turned off, and the voltage is dropped to 0 V, thus finishing the poling process.

The arm waveguides thus optically poled induces an electro-optic effect which allows the refractive index to change when an external electric field is applied. For example, the magnitude $\Delta n$ of a change of the refractive index which is produced when an external electric field Eex is applied in a TM direction is expressed as follows:

$$\Delta n_{TE} = (\tfrac{1}{2}) r_1 n_{TE}^2 E_{ex}$$

$$\Delta n_{TM} = (\tfrac{1}{2}) r_2 n_{TM}^3 E_{ex}$$

(see Nishihara, et. al., "optical integrated circuit" published by Ohm-sha). In the above equations, $r_1$, $r_2$ represent electro-optic constants in the TE, TM directions, respectively, upon application of the external electric field in the TM direction, and $n_{TE}$, $n_{TM}$ represent refractive indexes in the TE, TM directions, respectively. It will be seen from the above equations that the stronger the external electric field, the greater the change of the refractive index.

After the above poling process, a laser beam having a prespecified wavelength, i.e., such a wavelength that will cause a coupling in directional couplers 117, 118, is introduced from input port P1, and a voltage having a predetermined magnitude is applied between thin film electrode 116 and Si substrate 111. The laser beam introduced from input port P1 is coupled in directional coupler 117, propagated through waveguides 112, 113, then coupled in directional coupler 118, and propagated through the output waveguides of output ports P3, P4. FIG. 2 of the accompanying drawings show how the intensities of output beams from output ports P3, P4 change depending on the applied voltage. It can be seen from FIG. 2 that the phase of the output beams changes in substantial proportion to the applied voltage V.

As described above, it is possible to increase electro-optic constants and lower drive voltages according to the optically pumped poling process. However, the waveguide optical switch disclosed in the above publication which is processed by the optically pumped poling process suffers the following shortcomings if a UV radiation is used as the pumping radiation:

When the waveguide optical switch is UV-poled by introducing the UV radiation from input port P1 and applying a voltage of a predetermined magnitude between thin film electrode 116 and Si substrate 111, the introduced UV radiation is propagated through a Ge-doped waveguide to a region of the waveguide 112 which is to be pumped. Before the UV radiation reaches the region of the waveguide 112 which is to be pumped, the propagated UV radiation is partly absorbed by the Ge-doped waveguide. Since the UV radiation is progressively attenuated as it travels through the waveguide, the disclosed waveguide optical switch cannot efficiently be UV-poled, and fails to provide a uniform electro-optic effect. In addition, the waveguide which has absorbed the UV radiation tends to be damaged or otherwise made defective.

SUMMARY OF THE INVENTION

It is an object of the present invention to provide an optical waveguide device which has waveguides less susceptible to damage upon being irradiated with a UV radiation and which can efficiently be UV-poled, a method of manufacturing such an optical waveguide device, and a method of optically poling such an optical waveguide device.

To achieve the above object, there is provided in accordance with the present invention an optical waveguide device comprising a waveguide whose refractive index changes can be controlled by an electro-optic effect and a guide waveguide for coupling or applying an ultraviolet radiation to a predetermined area of the waveguide. The waveguide may comprise first and second waveguides serving as respective arms of Mach-Zehnder interferometer, and the guide waveguide may be arranged to couple or apply an ultraviolet radiation to a predetermined area of at least one of the first and second waveguides.

According to the present invention, there is also provided a method of manufacturing an optical waveguide device, comprising the steps of providing, on an optical substrate, a waveguide whose refractive index changes can be controlled by an electro-optic effect, and a guide waveguide for coupling or applying an ultraviolet radiation to a predetermined area of the waveguide, forming an electrode for generating an electric field having a predetermined magnitude, on a predetermined area of the waveguide, and applying an ultraviolet radiation to the predetermined area of the waveguide through the guide waveguide while a DC voltage having a predetermined magnitude is being applied to the electrode. The method may further comprise the step of removing the guide waveguide after the ultraviolet radiation is applied to the predetermined area of the waveguide. The step of forming the electrode may comprise the step of forming an electrode for controlling the refractive index changes of the waveguide due to the electro-optic effect.

According to the present invention, there is further provided a method of optically poling an optical waveguide device, comprising the steps of applying an electric field to a predetermined area of a waveguide disposed on a substrate and coupling or applying an ultraviolet radiation to the predetermined area of the waveguide through a guide waveguide made of a predetermined material. The waveguide may comprise first and second waveguides serving as respective arms of Mach-Zehnder interferometer, and the electric field may be applied to a predetermined area of at least one of the first and second waveguides and the ultraviolet radiation may be coupled or applied to the predetermined area of at least one of the first and second waveguides through the guide waveguide.

In the optical waveguide device and the method of optically poling the optical waveguide device, a directional coupler may be constructed of a portion of the waveguide and a portion of the guide waveguide, and the ultraviolet radiation propagated through the guide waveguide may be coupled to the predetermined area of the waveguide by the directional coupler.

The ultraviolet radiation radiated from an exit end of the guide waveguide may be applied to the predetermined area of the waveguide.

The guide waveguide may have an exit end facing a side of the waveguide, and the ultraviolet radiation propagated through the guide waveguide may be focused onto the predetermined area of the waveguide by the lens.

The guide waveguide may have a grating in a portion thereof, and the ultraviolet radiation propagated through the guide waveguide may be reflected to the predetermined area of the waveguide by the grating.

The grating may comprise a grating whose refractive index changes increase along the direction in which the ultraviolet radiation is propagated.

The guide waveguide may have a deflector in a portion thereof, and the ultraviolet radiation propagated through the guide waveguide may be deflected to the predetermined area of the waveguide by the deflector.

With the above arrangement, since the ultraviolet radiation can be coupled or applied to the predetermined area of the waveguide by the guide waveguide, any damage to the waveguide can be smaller than with the conventional optical waveguide device.

The guide waveguide is made of a material having high UV permeability such as $SiO_2$, for example. Therefore, the ultraviolet radiation is not liable to be greatly attenuated by absorption when propagated through the guide waveguide.

If the ultraviolet radiation is coupled by the directional coupler and refractive index changes of the portion of the guide waveguide which has the grating increase along the direction in which the ultraviolet radiation is propagated, then the guide waveguide is capable of uniformly coupling or applying the ultraviolet radiation to the desired area of the waveguide, allowing the waveguide to obtain a uniform electro-optic effect.

The above and other objects, features, and advantages of the present invention will become apparent from the following description with reference to the accompanying drawings which illustrate examples of the present invention.

BRIEF DESCRIPTION OF THE DRAWINGS

FIG. 3($b$) is a cross-sectional view taken along line III(b)—III(b) of FIG. 3($a$);

FIG. 4 is a block diagram of a system for UV-poling the waveguide optical switch shown in FIGS. 3($a$) and 3($b$);

FIG. 9 is a diagram showing the manner in which a DC voltage is applied in UV-poling the waveguide optical switch;

FIGS. 10(a) through 10(c) are cross-sectional views showing successive steps of a process of removing a UV guide waveguide;

FIG. 14 is a plan view of yet another UV radiating structure, which employs a deflector, applicable to the present invention;

FIG. 15 is a plan view of yet still another UV radiating structure, which employs a grating, applicable to the present invention;

FIG. 17 is a plan view of an optical modulator as an optical waveguide device according to still another embodiment of the present invention;

DESCRIPTION OF THE PREFERRED EMBODIMENTS

Figure 1:
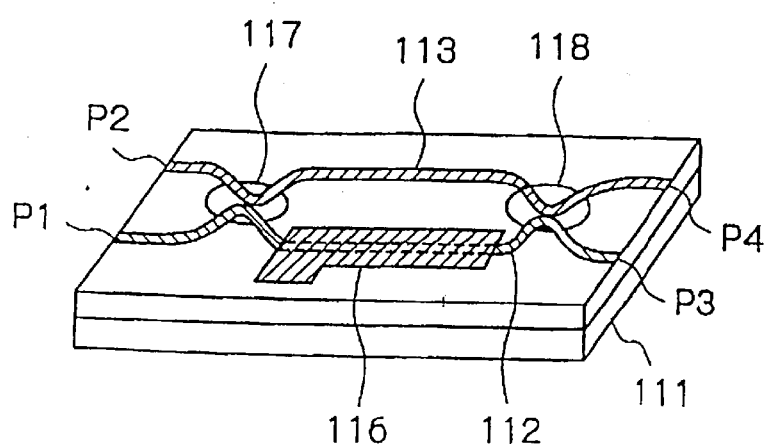
FIG. 1 is a perspective view of a waveguide optical switch disclosed in Japanese laid-open patent publication No. 9-258151.
Figure 2:
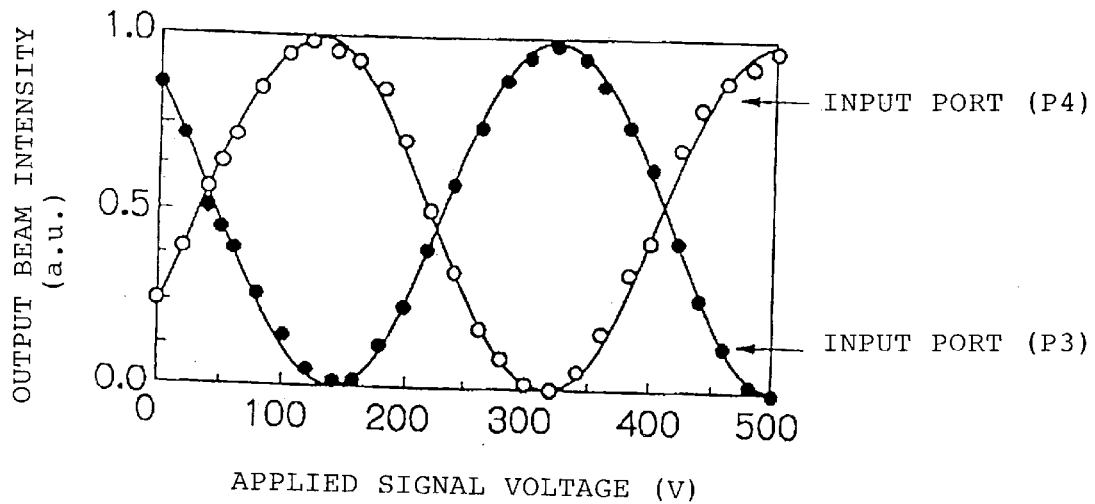
FIG. 2 is a diagram showing how the intensity of output beams of the waveguide optical switch shown in FIG. 1 changes depending on the applied voltage.
Figure 3A:
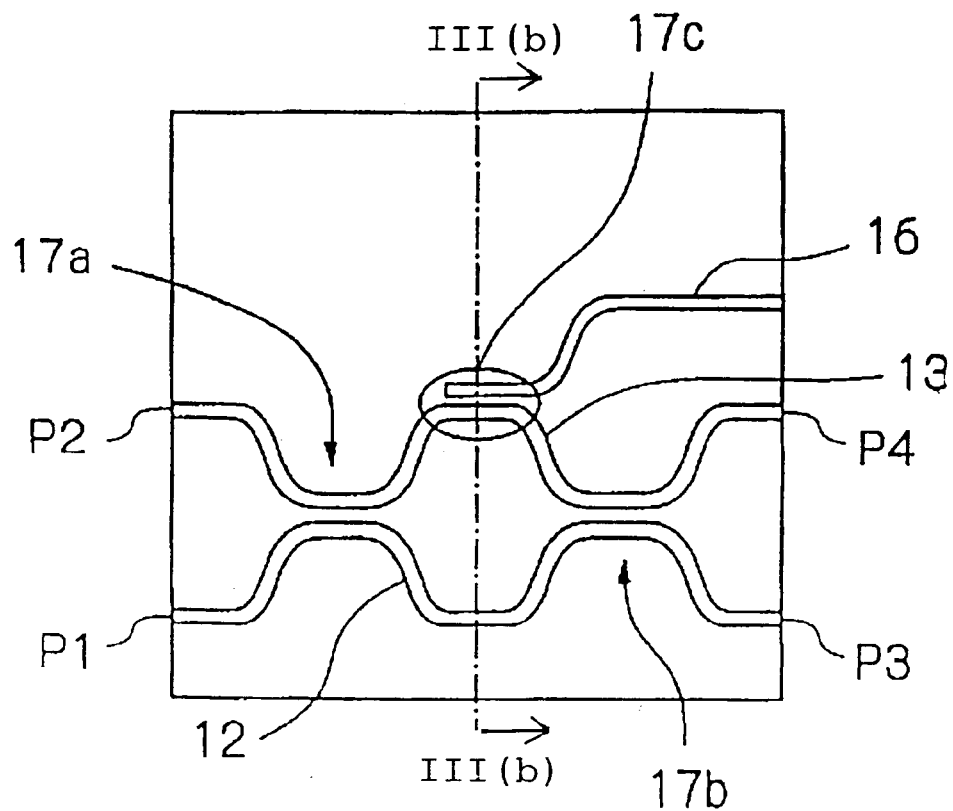
FIG. 3($a$) is a plan view of waveguides of a Mach-Zehnder interferometer waveguide optical switch as an optical waveguide device according to an embodiment of the present invention.
Figure 3B:
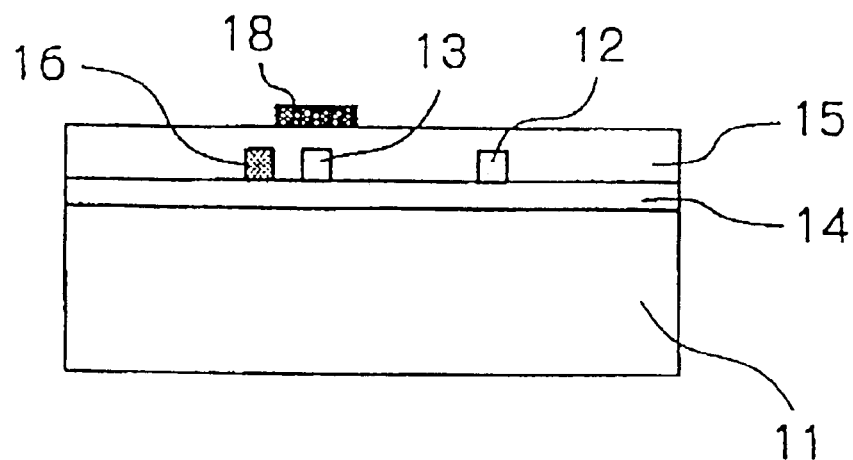

FIGS. 3(a) and 3(b) show a Mach-Zehnder interferometer waveguide optical switch as an optical waveguide device according to an embodiment of the present invention. As shown in FIGS. 3(a) and 3(b), the Mach-Zehnder interferometer waveguide optical switch comprises Si substrate 11, lower cladding 14 mounted on Si substrate 11, and waveguides 12, 13, UV (UltraViolet) guide waveguide 16, and upper cladding 15 which are disposed on lower cladding 14. A thin film electrode 18 is disposed on upper cladding 15. Si substrate 11 which is of a low resistance serves as an electrode opposing thin film electrode 18. Alternatively, Si substrate 11 may not be used as an electrode opposing thin film electrode 18, but another opposing electrode may be used.

Waveguides 12, 13 serve as the arms of a Mach-Zehnder, interferometer. Waveguides 12, 13 have ends coupled respectively to two input waveguides as input ports P1, P2 by directional coupler 17a, and other ends coupled respectively to two output waveguides as output ports P3, P4 by directional coupler 17b.

UV guide waveguide 16 is arranged such that pumping light, e.g., a UV radiation, emitted from an external light source, e.g., a UV radiation source, enters from one end thereof, and a portion of the other end thereof and a portion of waveguide 13 as one of the arms jointly make up directional coupler 17c. The UV radiation propagated through UV guide waveguide 16 is optically coupled to the portion of waveguide 13 by directional coupler 17c, and hence is applied in optically poling the waveguide optical switch. For a better optical coupling, the waveguides that make up directional coupler 17c should preferably be spaced a distance of 10 µm or less from each other. The UV radiation from the external UV radiation source can be applied to UV guide waveguide 16 by an optical fiber, a condensing lens, or the like.

FIG. 4 shows a system for optically poling the waveguide optical switch. As shown in FIG. 4, a UV radiation from a UV radiation source 21 is propagated through optical fiber 23 and focused by a condensing lens 24 onto the entrance end of UV guide waveguide 16. The focused UV radiation enters UV guide waveguide 16 from its entrance end, is propagated through UV guide waveguide 16, and is optically coupled to a predetermined area of waveguide 13 by directional coupler 17c. High-voltage DC power supply 22 applies a voltage of a predetermined magnitude between Si substrate 11 and thin film electrode 18 to generate a high electric field therebetween.

The waveguide optical switch is UV-poled when the UV radiation from UV radiation source 21 is applied via UV guide waveguide 16 to the predetermined area of waveguide 13 while the high electric field is being generated between Si substrate 11 and thin film electrode 18 by high-voltage DC power supply 22. The UV radiation may comprise, for example, an ArF laser beam having a wavelength of 193 nm. If the ArF laser beam is used, then the waveguide optical switch is UV-poled into a desired switch device by applying the UV radiation at an energy density of 100 mJ/cm$^2$ for a period of time ranging from several to 20 minutes while the waveguide optical switch is being placed in an electric field of $1 \times 10^5$ V/cm (applied voltage/distance).

After the waveguide optical switch is UV-poled, UV guide waveguide 16 may be removed. Usually, however, UV guide waveguide 16 is not removed for the reason of reducing the number of steps involved in the poling process.

Heretofore, as described above, since the waveguide optical switch has been poled by propagating the UV radiation directly through the Ge-doped arm waveguide, the arm waveguide tends to absorb the UV radiation and be damaged by the UV radiation. According to the present invention, however, because the UV radiation is coupled to the desired area of the arm waveguide through the guide waveguide which is made of a silicon oxide film that absorbs the UV radiation to a lesser extent, the waveguide optical switch can efficiently be UV-poled and can prevent UV-induced damage to the arm waveguide. Furthermore, the directional coupler uniformly couples the UV radiation to the desired area of the arm waveguide to achieve a uniform electro-optic effect.

Figure 5:
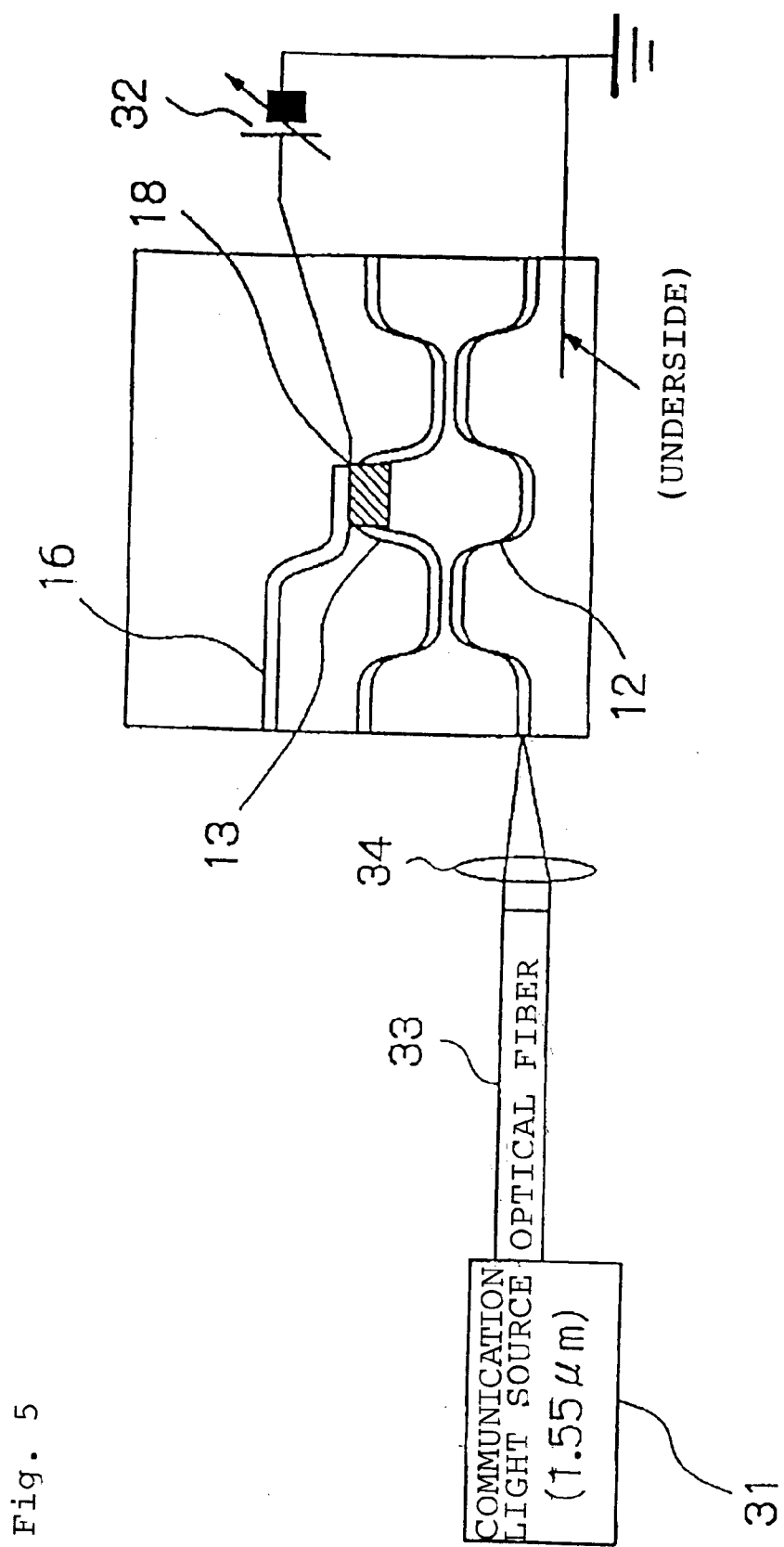
FIG. 5 is a block diagram of a system for operating the UV-poled waveguide optical switch shown in FIGS. 3($a$) and 3($b$) as an optical switch.

FIG. 5 shows a system for operating the Mach-Zehnder waveguide with the electro-optic effect produced in the arm by the UV-poling process, as an optical switch. In the system shown in FIG. 5, a communication light having a wavelength of 1.55 µm is emitted from communication light source 31 and guided by optical fiber 33 to a position near the entrance end of waveguide 12 of one of the arms of the Mach-Zehnder interferometer. The communication light emitted from the end of optical fiber 33 is focused by a condensing lens 34 onto the entrance end of waveguide 12. The focused communication light enters waveguide 12 from the entrance end thereof, is propagated through waveguide 12, is coupled by directional coupler 17a, and is propagated through the arms of waveguides 12, 13.

When a DC voltage is applied between thin film electrode 18 and Si substrate 11 by DC power supply 32, the arm of waveguide 13 changes its refractive index depending on the magnitude of the applied voltage. As a result, the phase of the communication light propagated through the arms changes, causing the Mach-Zehnder interferometer to change the intensity of its output. If the output of the Mach-Zehnder interferometer is represented by $E_0$, the output $E_0$ is expressed by the following equation (1):

$$E_0 \propto \cos^2(\phi/2) \tag{1}$$

where $\phi$ represents the phase difference between the arm waveguides.

Figure 6:
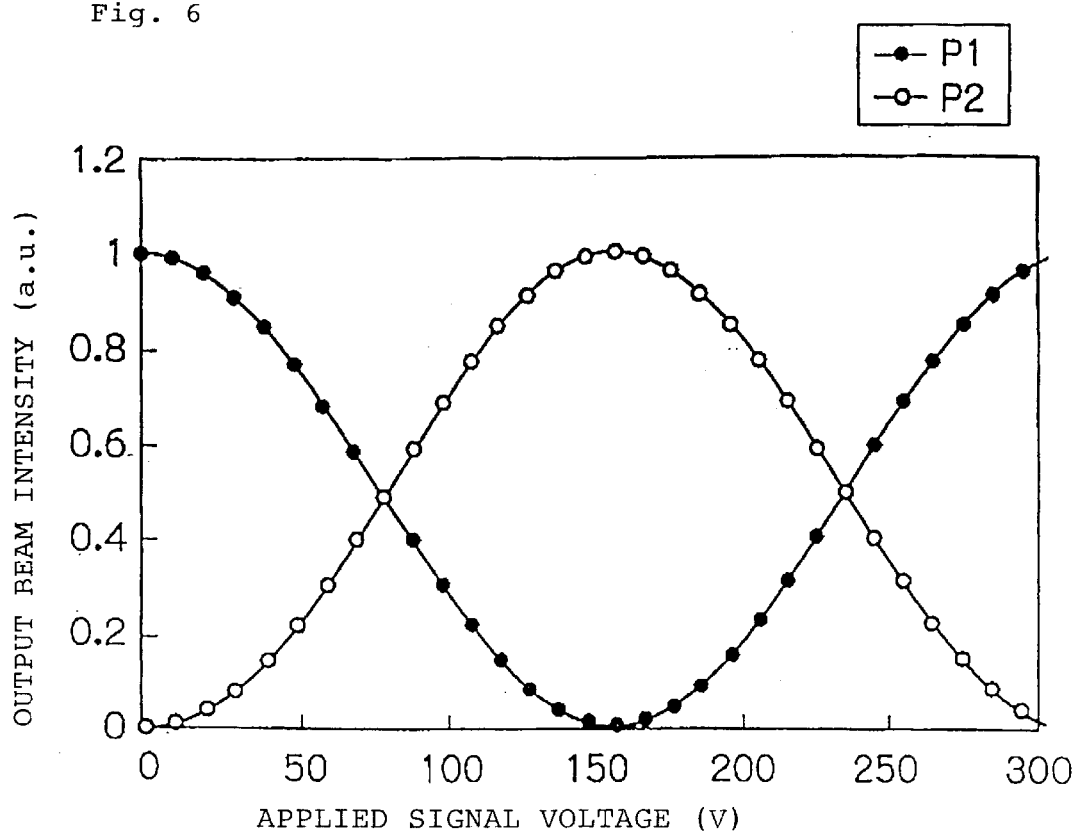
FIG. 6 is a diagram showing how the intensity of output beams of the waveguide optical switch shown in FIGS. 3($a$) and 3($b$) changes depending on the applied voltage.

FIG. 6 shows the intensity of output beams of the arms of the Mach-Zehnder waveguide optical switch. As can be seen from FIG. 6, the outputs P1, P2 are complementary in intensity to each other, and the light signals can effectively be turned on and off by adjusting the applied voltage.

The Mach-Zehnder waveguide optical switch described above uses the thin film electrode employed in the UV poling process as the electrode for performing the switching action. However, the electrode for the UV poling process and the electrode for performing the switching action may be separate from each other, and the electrode for the UV poling process should preferably be removed eventually.

In the system shown in FIG. 5, one of the arms of the Mach-Zehnder waveguide optical switch has the electrode for performing the switching action. However, both arm waveguides may have respective electrodes to provide a push-pull structure. Such a push-pull structure requires a voltage to be applied of a magnitude which is one-half of the voltage required by the structure having the electrode disposed on one of the arms only.

Figure 7:
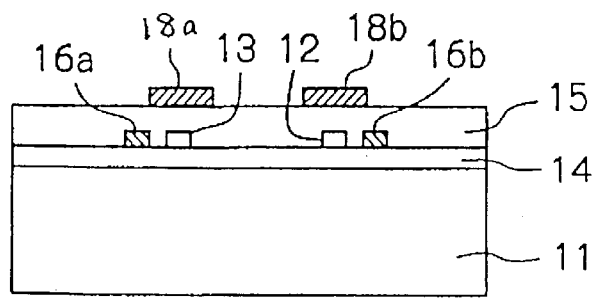
FIG. 7 is a cross-sectional view of a push-pull waveguide optical switch according to another embodiment of the present invention.

FIG. 7 shows in cross section a push-pull waveguide optical switch according to another embodiment of the present invention. The push-pull waveguide optical switch shown in FIG. 7 has two sets of UV guide waveguides 16a, 16b and thin film electrodes 18a, 18b which are combined with respective waveguides 12, 13 that serves as respective two arms of a Mach-Zehnder interferometer, for UV-poling both waveguides 12, 13. For UV-poling waveguides 12, 13, they may be UV-poled twice to make the polarities of the arms identical to each other, and for switching waveguides 12, 13, voltages may be applied to make the polarities of the arms opposite to each other. Alternatively, for UV-poling waveguides 12, 13, they may be UV-poled to make the polarities of the arms opposite to each other, and for switching waveguides 12, 13, voltages may be applied to make the polarities of the arms identical to each other.

A specific process of fabricating the above optical waveguide device will be described below.

FIGS. 8(a) through 8(g) are cross-sectional views showing successive steps of a process of fabricating the waveguide optical switch shown in FIGS. 3(a) and 3(b). In the illustrated process, lower cladding 14 is made of BPSG (Boro-PhosphoSilicated Glass), and the waveguides are made of Ge-doped $SiO_2$. Waveguides 12, 13, 16 are produced in the same manner as disclosed in Japanese laid-open patent publication No. 9-258151.

Figure 8A:
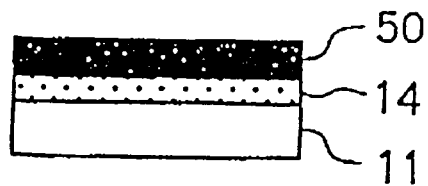
FIGS. 8(a) through 8(g) are cross-sectional views showing successive steps of a process of fabricating the waveguide optical switch shown in FIGS. 3(a) and 3(b)
Figure 8B:
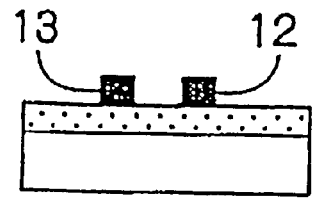

First, as shown in FIG. 8(a), lower cladding 14 and core 50 are successively grown on Si substrate 11 by normal-pressure CVD (APCVD). Then, as shown in FIG. 8(b), core 50 is patterned into waveguides 12, 13 by reactive ion etching. Each of waveguides 12, 13 has a cross-sectional size of 5.5 $\mu$m×5.5 $\mu$m.

Figure 8C:
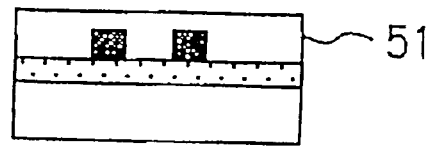
Figure 8D:
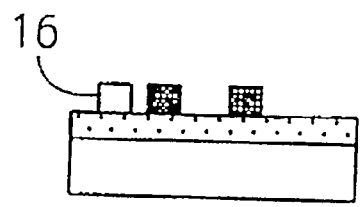
Figure 8E:
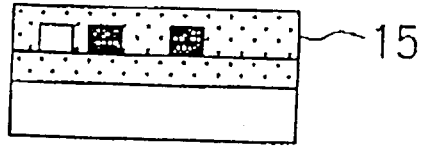
Figure 8F:
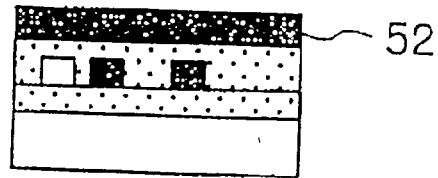
Figure 8G:
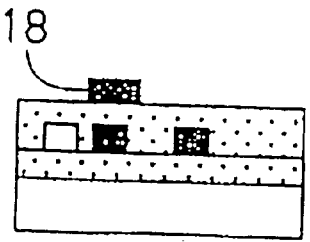

Then, as shown in FIG. 8(c), pure $SiO_2$ layer 51 is deposited by APCVD. Deposited pure $SiO_2$ layer 51 is subjected to reactive ion etching to produce UV guide waveguide 16, as shown in FIG. 8(d). Upper cladding 15 of BPSG is deposited by APCVD, as shown in FIG. 8(e). Then, Al thin film 52 is grown on upper cladding 15 by sputtering, as shown in FIG. 8(f). Al thin film 52 is then patterned into thin film electrode 18, as shown in FIG. 8(g).

Finally, the waveguide optical switch fabricated as shown in FIGS. 8(a) through 8(g) is UV-poled into a switch device. Specifically, as shown in FIG. 9, while a DC voltage ranging from 1 to 10 kV is being applied between thin film electrode 18 and Si substrate 11, a desired area of waveguide 13 is pumped by a UV radiation that is propagated through UV guide waveguide 16.

The waveguide optical switch shown in FIGS. 3(a) and 3(b) can be fabricated according to the process described above. After the UV poling process, UV guide waveguide 16 may be removed as it is no longer necessary. For example, UV guide waveguide 16 can be removed by a process shown in FIGS. 10(a) through 10(c).

A portion, including UV guide waveguide 16, of the waveguide optical switch (see FIG. 10(a)) which has been UV-poled by the process shown in FIGS. 8(a) through 8(g) is scraped off by reactive ion etching, as shown in FIG. 10(b). Then, as shown in FIG. 10(c), the scraped region is filled up with the same material (BPSG) as upper cladding 15. The waveguide optical switch from which UV guide waveguide 16 has thus been removed can be used in the same manner as with the waveguide optical switch in which UV guide waveguide 16 remains unremoved.

<UV Applying Structures>

In the arrangement shown in FIGS. 3(a) and 3(b), the UV radiation propagated through UV guide waveguide 16 is coupled to the desired area of waveguide 13 by directional coupler 17c. The present invention is not limited to such a UV applying structure, but may be applied to structures in which the UV radiation is applied to a desired area of an arm waveguide by a UV guide waveguide. Several such UV applying structures will be described below.

Figure 11:
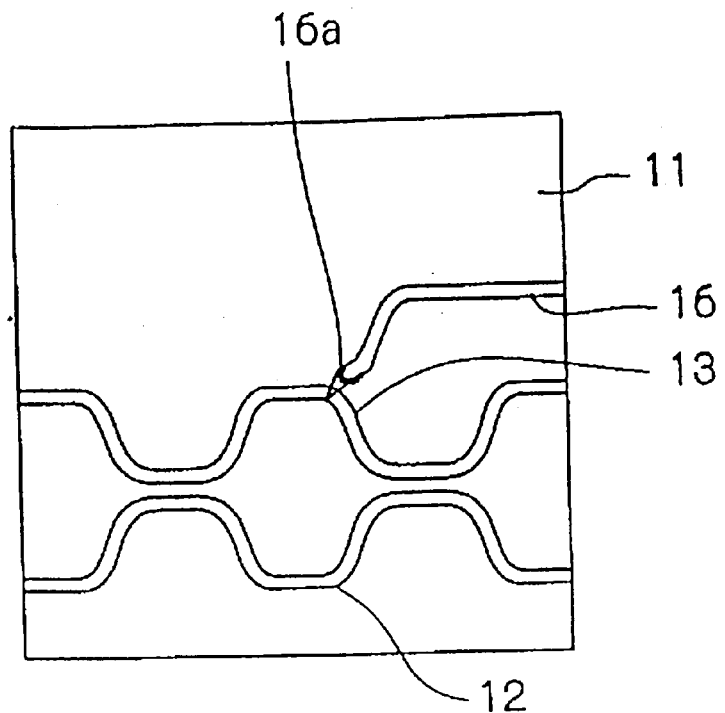
FIG. 11 is a plan view of a UV radiating structure applicable to the present invention.

(1) UV Guide Waveguide with a Lens:

FIG. 11 shows a UV radiating structure applicable to the present invention. The UV radiating structure shown in FIG. 11 is the same as the structure shown in FIGS. 3(a) and 3(b) except for UV guide waveguide 16.

As shown in FIG. 11, UV guide waveguide 16 has a lens 16a on its exit end which is remote from the end where the UV radiation enters UV guide waveguide 16. Lens 16a is produced by shaping the distal end of UV guide waveguide 16 into a lens. Lens 16a serves to focus the UV radiation propagated through UV guide waveguide 16 onto a desired area of waveguide 13. Lens 16a can be formed by patterning UV guide waveguide 16 to shape the distal end thereof into an arcuate shape having a radius of curvature of about 3 $\mu$m in the patterning step shown in FIG. 8(d).

Since the UV radiation propagated through UV guide waveguide 16 is focused by lens 16a onto the desired area of waveguide 13, the UV radiation can be applied efficiently with a reduced amount of energy. The structure shown in FIG. 11 is capable of reducing UV-induced damage in waveguide 13.

Figure 12:
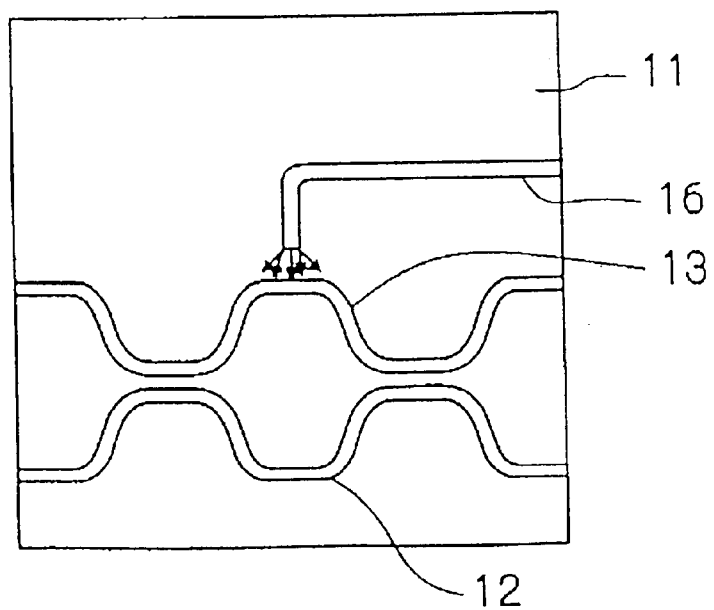
FIG. 12 is a plan view of another UV radiating structure applicable to the present invention.

(2) End-radiation UV Guide Waveguide:

The UV radiation propagated through UV guide waveguide 16 which has no lens 16a may simply be radiated from the exit end of UV guide waveguide 16 to a desired area of waveguide 13. FIG. 12 shows another UV radiating structure applicable to the present invention, based on such a principle.

In FIG. 12, the exit end of UV guide waveguide 16 which is remote from the end where the UV radiation enters UV guide waveguide 16 is directed to face a side of waveguide 13. The UV radiation radiated from the exit end of UV guide waveguide 16 is applied to irradiate the desired area of waveguide 13. The structure shown in FIG. 12 is also capable of reducing UV-induced damage in waveguide 13. The structure shown in FIG. 12 can be fabricated in a less number of steps and at a reduced cost because the exit end of UV guide waveguide 16 does not need to be shaped into a lens.

Figure 13A:
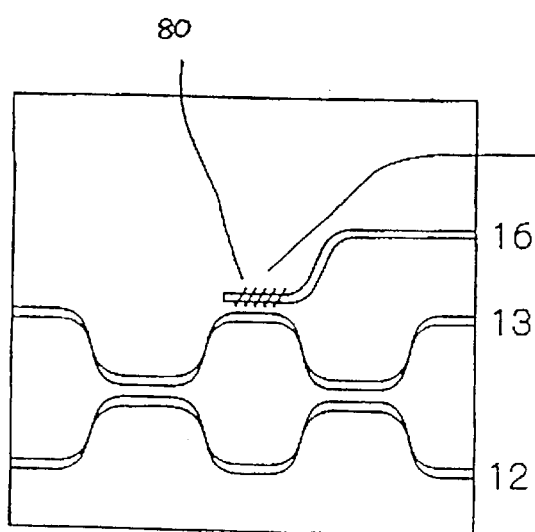
FIG. 13(a) is a plan view of still another UV radiating structure, which employs a grating, applicable to the present invention.

(3) UV Guide Waveguide with a Grating:

The UV guide waveguide may have a grating in its portion for reflecting the UV radiation to irradiate a desired area of waveguide 13. FIG. 13(a) shows a UV radiating structure with a grating. The UV applying structure shown in FIG. 13(a) is the same as the structure shown in FIGS. 3(a) and 3(b) except for UV guide waveguide 16.

As shown in FIG. 13(a), UV guide waveguide 16 has grating 80 in its portion. Grating 80 has a pitch a expressed as follows:

$$a = n\lambda/2 \cos \theta$$

where $\lambda$ represents the wavelength of the UV radiation to irradiate waveguide 13, n the refractive index of UV guide waveguide 16 with respect to the wavelength of the UV radiation, and $\theta$ the angle of reflection. If the UV radiation comprises an ArF laser beam having a wavelength of 193 nm and is reflected at an angle of reflection of 45°, then the pitch a of grating 80 is about 0.2 $\mu$m. The grating can be produced by applying a UV radiation with a phase mask according to a line-and-space pattern of 0.2 $\mu$m to modulate the refractive index change of the waveguide material. The refractive index of each line is determined by the time in which the UV radiation is applied.

Figure 13B:
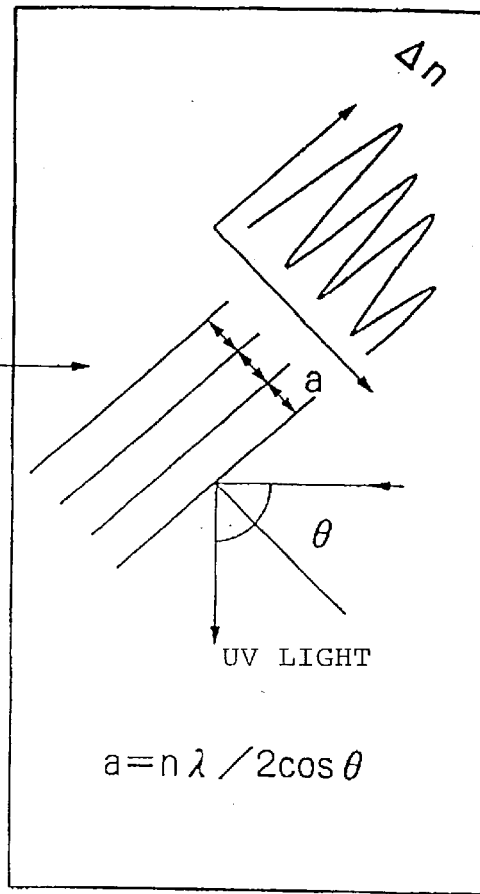
FIG. 13(b) is a diagram showing a change in the refractive index of the grating shown in FIG. 13(a)

As shown in FIG. 13(b), if the refractive index change $\Delta$n in the portion of UV guide waveguide 16 where grating 80 is provided increases in the direction in which the UV radiation is propagated, then the intensity of the UV radiation reflected by grating 80 can be uniformized with respect to the direction in which the UV radiation is propagated through the guide waveguide. As a result, the desired area of waveguide 13 can be irradiated with the UV radiation at a uniform intensity.

Grating 80 can be formed by changing the time in which the UV radiation is applied. Specifically, the speed at which the UV radiation is swept is reduced toward the direction of propagation thereof to achieve the distribution of refractive index changes $\Delta$n shown in FIG. 13(b).

(4) UV Guide Waveguide with a Deflector:

The waveguide may have a recess (deflector) of appropriate shape that is rotationally symmetric about an axis perpendicularly to the plane of the waveguide to achieve desired light path conversion characteristics. FIG. 14 shows a UV applying structure with such a deflector.

The UV applying structure shown in FIG. 14 is the same as the structure shown in FIGS. 3(a) and 3(b) except for UV guide waveguide 16. As shown in FIG. 14, the UV applying structure has two-dimensional waveguide (slab waveguide) 82 having an end partly coupled to the end of UV guide waveguide 16. FIG. 14 shows a UV irradiating section of the UV applying structure at an enlarged scale.

Two-dimensional waveguide 82 has deflector 81 as a recess in a portion thereof. Two-dimensional waveguide 82 with deflector 81 can be produced, for example, by defining a recess having a predetermined diameter and depth in a glass substrate and depositing epoxy in and over the recess (For details, see S. Sottini, et. al., J. Opt. Soc. Am., 70, 10, 1230, 1980). With this UV applying structure, the UV radiation propagated through UV guide waveguide 16 travels into two-dimensional waveguide 82, is deflected through about 45° by deflector 81, and is propagated through two-dimensional waveguide 82, from which the UV radiation enters waveguide 13.

In the specific structure shown in FIG. 14, the exit end of two-dimensional waveguide 82 is coupled to the side of waveguide 13. However, the exit end of two-dimensional waveguide 82 may be spaced to the side of waveguide 13. In such a modification, the UV radiation radiated from the exit end of two-dimensional waveguide 82 is applied to the desired area of waveguide 13.

(5) UV Guide Waveguide with a Grating (Wavefront Conversion):

Wavefront conversion based on the holographic principle can be performed simultaneously with coupling by appropriately modulating the period and pattern of the grating. Wavefront conversion makes it possible to apply the UV radiation to the UV guide waveguide, not from the side of the substrate, but from above. However, the UV radiation is applied to the side of waveguide 13. FIG. 15 shows a UV guide waveguide with such wavefront conversion.

As shown in FIG. 15, UV guide waveguide 16 has grating 83 disposed in a portion thereof for coupling the UV radiation applied from above (indicated by the broken-line arrow) to UV guide waveguide 16 and also performing wavefront conversion based on the holographic principle. The UV radiation which has been wavefront-converted by grating 83 (indicated by the solid-line arrow) is emitted from the exit end of UV guide waveguide 16 to irradiate the desired area of waveguide 13.

If desired, leeway in the UV applying structure shown in FIG. 15 can be increased because the UV radiation is applied to UV guide waveguide 16, not from the end thereof, but from above. The structure for performing wavefront conversion with the grating is also applicable to UV guide waveguide 16 shown in FIGS. 3(a) and 3(b) and any of the UV applying structures (1) through (4) described above.

Figures 16A, 16B:
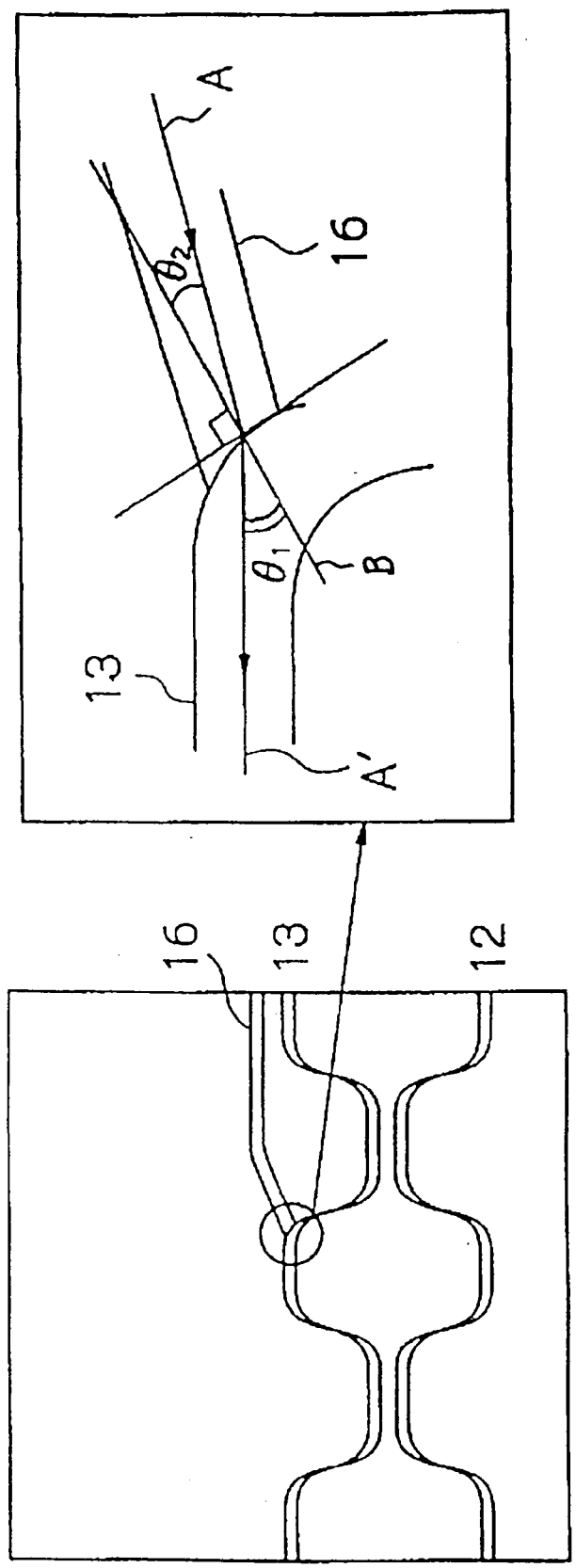
FIG. 16(a) is a plan view of another UV radiating structure, which is based on Snell's law, applicable to the present invention.
FIG. 16(b) is a diagram showing the angle of incidence of a UV radiation.

(6) Other UV Radiating Structure:

Another UV radiating structure takes into account the efficiency with which to apply the UV radiation to waveguide 13. FIG. 16(a) shows such a UV radiating structure. With this UV radiating structure, the UV radiation is applied not to the side of the arm waveguide, but to a corner thereof at a given angle of incidence. Specifically, as shown in FIG. 16(b), UV guide waveguide 16 is disposed to face a corner of waveguide 13 (arm waveguide), and the angle of incidence of the UV radiation upon waveguide 13 satisfies the following condition according to the Snell's law:

$$n_1 \sin \theta_1 = n_2 \sin \theta_2$$

where $n_1$ represents the refractive index of waveguide 13 (arm waveguide), $n_2$ the refractive index of UV guide waveguide 16, $\theta_2$ the angle formed between a UV ray A passing through the center of UV guide waveguide 16 and a normal B to a line at the corner of waveguide 13 crossed by the UV ray A, and $\theta_1$ the angle formed between a UV ray A' entering waveguide 13 (arm waveguide) and the normal B.

In the structure based on Snell's law, it is possible to increase the efficiency with which the UV radiation propagated through UV guide waveguide 16 is applied to waveguide 13 (arm waveguide). Therefore, the UV radiation can be applied to the arm waveguide with increased efficiency.

In the above structures, the material (UV-permeable material) of the UV guide waveguide may be LiF, $CaF_2$, $MgF_2$, etc. other than $SiO_2$. It should, however, preferably be $SiO_2$ in view of the convenience of processing steps including film growth, etching, etc.

In the waveguide optical switches according to the above embodiments, the arm waveguides have input and output ends coupled by directional couplers 17a, 17b. However, directional couplers 17a, 17b may be replaced with couplers of Y-branch structure.

In the arrangement of either one of the above embodiments, because the UV radiation is coupled or applied to the desired area of the arm waveguide via the UV guide waveguide, the UV radiation can be applied efficiently to the desired area of the arm waveguide. This UV applying structure is capable of reducing UV-induced damage within the waveguide.

<Other embodiment: Optical Modulator>

In each of the above embodiments, the present invention is applied to a Mach-Zehnder interferometer waveguide optical switch. However, the principles of the present invention are not limited to such an arrangement, but are also applicable to any waveguide optical switch having a waveguide whose refractive index changes can be controlled by an electro-optic effect. For example, the principles of the present invention can be applied to a directionally coupling optical modulator.

FIG. 17 schematically shows an optical modulator as an optical waveguide device according to still another embodiment of the present invention. The optical modulator shown in FIG. 17 has waveguides 12, 13 serving as two arms of a Mach-Zehnder interferometer which are disposed on the surface of Si substrate 11, as is the case with the waveguide optical switch shown in FIGS. 3(a) and 3(b), and UV guide waveguides 16a, 16b disposed on opposite sides of waveguides 12, 13. The arms of waveguides 12, 13 have input ends coupled to each other by a coupler of Y-branch structure, and output ends coupled to each other by directional coupling 17c. Thin film electrode 18a serving as a signal electrode is disposed on waveguide 13, and a thin film electrode 18b serving as a ground electrode is disposed on waveguide 12. Thin film electrode 18a has an end connected to a power supply circuit 60, and an opposite end connected to thin film electrode 18b via terminator 61.

The optical modulator is optically poled in the same manner as with the waveguide optical switches described above, using UV guide waveguides 16a, 16b. For optically poling the optical modulator, thin film electrodes 18a, 18b may be used as thin film electrodes for the optical poling process, or other thin film electrodes may be used as thin film electrodes for the optical poling process.

Figure 18:
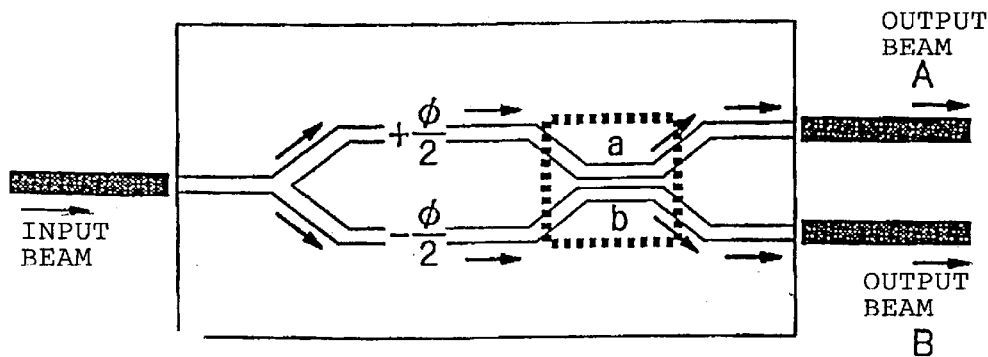
FIG. 18 is a plan view showing how light waves are propagated in the optical modulator shown in FIG. 17.

With the optical modulator shown in FIG. 17, a desired one of two output beams from the arms of waveguides 12, 13 can be employed as a modulated beam. FIG. 18 schematically shows the manner in which light waves are propagated in the optical modulator.

As shown in FIG. 18, an input beam is divided by a coupler of Y-branch structure into two equal beams, which travel respectively through the arm waveguides (12, 13). At this time, electric fields generated by applying signal voltages to thin film electrode 18a are applied in opposite directions perpendicular to the arm waveguides (12, 13). The light waves are phase-modulated by $\pm\phi/2$ in the arm waveguides (12, 13). The light waves that have been phase-modulated by $\pm\phi/2$ in the arm waveguides (12, 13) are optically coupled to each other by directional coupling 17c, and then output as a main signal and an inverted signal, respectively.

Figure 19:
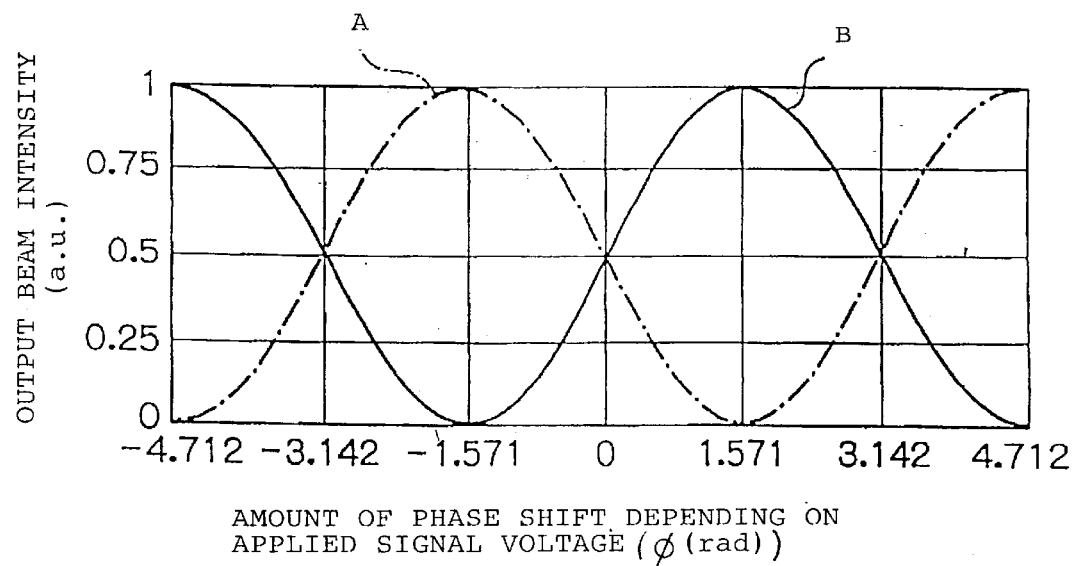
FIG. 19 is a diagram showing the manner in which output beams from the optical modulator shown in FIG. 17 change depending on the voltage of an input signal applied to the optical modulator.

FIG. 19 shows the manner in which output beams from the optical modulator shown in FIG. 17 change depending on the voltage of an input signal applied to the optical modulator. As shown in FIG. 19, the output beams from the respective arm waveguides (12, 13) are complementary in intensity to each other. These output beams should preferably have respective output intensities set in such a zero-crossing manner that they are identical to each other when the applied signal voltage is 0 V. With such a setting, it is possible to set an initial operating point to the phase of $\pi/2$.

According to the present invention, as described above, since any damage to a waveguide due to the application of UV radiation is small and the waveguide can be UV-poled efficiently, it is possible to provide a waveguide optical switch which is highly stable and reliable.

While preferred embodiments of the present invention have been described using specific terms, such description is for illustrative purposes only, and it is to be understood that changes and variations may be made without departing from the spirit or scope of the following claims.

What is claimed is:

1. An optical waveguide device comprising:
   a waveguide whose refractive index changes can be controlled by an electro-optic effect; and
   a guide waveguide for coupling or applying an ultraviolet radiation directly to a predetermined area of said waveguide, wherein said predetermined area is not at an input port of said waveguide.

2. An optical waveguide device according to claim 1, wherein said waveguide comprises:
   first and second waveguides serving as respective arms of a Mach-Zehnder interferometer, and said guide waveguide is arranged to couple or apply the ultraviolet radiation to the predetermined area of at least one of said first and second arm waveguides.

3. An optical waveguide device according to claim 1, further comprising:
   a directional coupler constructed of a portion of said waveguide and a portion of said guide waveguide.

4. An optical waveguide device according to claim 1, wherein said guide waveguide has an exit end shaped as a lens.

5. An optical waveguide device according to claim 1, wherein said guide waveguide has an exit end facing a side of said waveguide.

6. An optical waveguide device according to claim 1, wherein said guide waveguide has a grating in a portion thereof.

7. An optical waveguide device according to claim 6, wherein refractive index changes in the portion of said guide waveguide which has said grating increase along the direction in which the ultraviolet radiation is propagated.

8. An optical waveguide device according to claim 1, wherein said guide waveguide has a deflector in a portion thereof.

9. An optical waveguide device according to claim 1, wherein said guide waveguide is made of a silicon oxide film.

10. A method of manufacturing an optical waveguide device, comprising the steps of:
    providing, on an optical substrate, a waveguide whose refractive index changes can be controlled by an electro-optic effect, and a guide waveguide for coupling or applying an ultraviolet radiation directly to a first predetermined area of said waveguide, wherein said first predetermined area is not at an input port of said waveguide;

forming an electrode for generating an electric field having a predetermined magnitude, on a second predetermined area of said waveguide; and applying an ultraviolet radiation to the first predetermined area of said waveguide through said guide waveguide while a DC voltage having a predetermined magnitude is being applied to said electrode.

11. A method according to claim 10, further comprising the step of:

removing said guide waveguide after the ultra-violet radiation is applied to the first predetermined area of said waveguide.

12. A method according to claim 10, wherein said step of forming said electrode comprises the step of:

forming an electrode for controlling the refractive index changes of said waveguide due to the electro-optic effect.

13. A method of optically poling an optical waveguide device, comprising the steps of:

applying an electric field to a predetermined area of a waveguide disposed on an optical substrate, wherein said predetermined area is not at an input port of said waveguide; and coupling or applying an ultraviolet radiation directly to said predetermined area of the waveguide through a guide waveguide made of a predetermined material.

14. A method according to claim 13, wherein said waveguide comprises first and second waveguides serving as respective arms of a Mach-Zehnder interferometer, and wherein said electric field is applied to said predetermined area of at least one of said first and second waveguides and the ultraviolet radiation is coupled or applied to said predetermined area of at least one of said first and second waveguides through said guide waveguide.

15. A method according to claim 13, wherein the ultraviolet radiation propagated through said guide waveguide is coupled to said predetermined area of the waveguide by a directional coupler constructed of a portion of said waveguide and a portion of said guide waveguide.

16. A method according to claim 13, wherein the ultraviolet radiation radiated from an exit end of said guide waveguide is applied to said predetermined area of the waveguide.

17. A method according to claim 13, wherein the ultraviolet radiation propagated through said guide waveguide is focused onto said predetermined area of the waveguide by a lens formed on an exit end of said guide waveguide.

18. A method according to claim 13, wherein the ultraviolet radiation propagated through said guide waveguide is reflected to said predetermined area of the waveguide by a grating formed in a portion of said guide waveguide.

19. A method according to claim 18, wherein said grating comprises a grating whose refractive index changes increase along the direction in which the ultraviolet radiation is propagated.

20. A method according to claim 13, wherein the ultraviolet radiation propagated through said guide waveguide is deflected to said predetermined area of the waveguide by a deflector formed in a portion of said guide waveguide.

21. A method according to claim 13, wherein said guide waveguide comprises a waveguide made of a silicon oxide film.

* * * * *